United States Patent
Pehlivan et al.

[11] Patent Number: 5,906,241
[45] Date of Patent: May 25, 1999

[54] METHOD FOR BUBBLING EXTRACTION OF GROUNDWATER

[75] Inventors: Mehmet Pehlivan, Mission Viejo; James R. Miller, Palos Verdes Est., both of Calif.

[73] Assignee: Tait Environmental Management, Inc., Calif.

[21] Appl. No.: 08/897,201

[22] Filed: Jul. 21, 1997

[51] Int. Cl.$^6$ .............................. E21B 43/00; E21B 43/12
[52] U.S. Cl. ......................... 166/372; 166/370; 405/128; 210/170; 210/747
[58] Field of Search ...................... 405/52, 128; 166/67, 166/68.5, 370, 372; 210/170, 747

[56] References Cited

U.S. PATENT DOCUMENTS

| | | | |
|---|---|---|---|
| 4,765,902 | 8/1988 | Ely et al. | 405/128 X |
| 5,031,697 | 7/1991 | Wellington et al. | 166/372 X |
| 5,050,676 | 9/1991 | Hess et al. | 166/370 X |
| 5,076,360 | 12/1991 | Morrow | 166/370 X |
| 5,262,065 | 11/1993 | Hansen | 210/747 |
| 5,358,357 | 10/1994 | Mancini et al. | 405/128 |
| 5,464,309 | 11/1995 | Mancini et al. | 405/128 X |
| 5,628,364 | 5/1997 | Trenz | 405/128 X |

FOREIGN PATENT DOCUMENTS

| | | | |
|---|---|---|---|
| 6254537 | 9/1994 | Japan | 210/170 |
| 775297 | 10/1980 | U.S.S.R. | 166/372 |

*Primary Examiner*—David J. Bagnell
*Assistant Examiner*—Jong-Suk Lee
*Attorney, Agent, or Firm*—Klein & Szekeres, LLP

[57] ABSTRACT

An apparatus for extracting groundwater from a well extending below the static groundwater table includes an extraction pipe having a distal end located a predetermined distance below the static groundwater table, and a proximal end adapted for communication with a source of subatmospheric pressure. The extraction pipe includes a "bubbling hole" a short distance above a static water column established in the well to introduce air bubbles into the extraction pipe to augment the vacuum in lifting the water through the extraction pipe. A method of extracting groundwater employing this apparatus includes the steps of (1) measuring the height of the static water column in the well; (2) providing an extraction pipe having a proximal end, a distal end, and a hole located axially along the length of the extraction pipe at a specified distance from the distal end thereof; (3) extending the extraction pipe into the well so that the distal end of the extraction pipe is located at a first predetermined distance below the static groundwater table, and the hole is located a second predetermined distance above the static water column in the well; and (4) applying a subatmospheric pressure to the proximal end of the extraction pipe, the magnitude of the subatmospheric pressure being sufficient to lift the groundwater through the proximal end of the extraction pipe with the assistance of air bubbles introduced into the extraction pipe from the well through the hole.

8 Claims, 5 Drawing Sheets

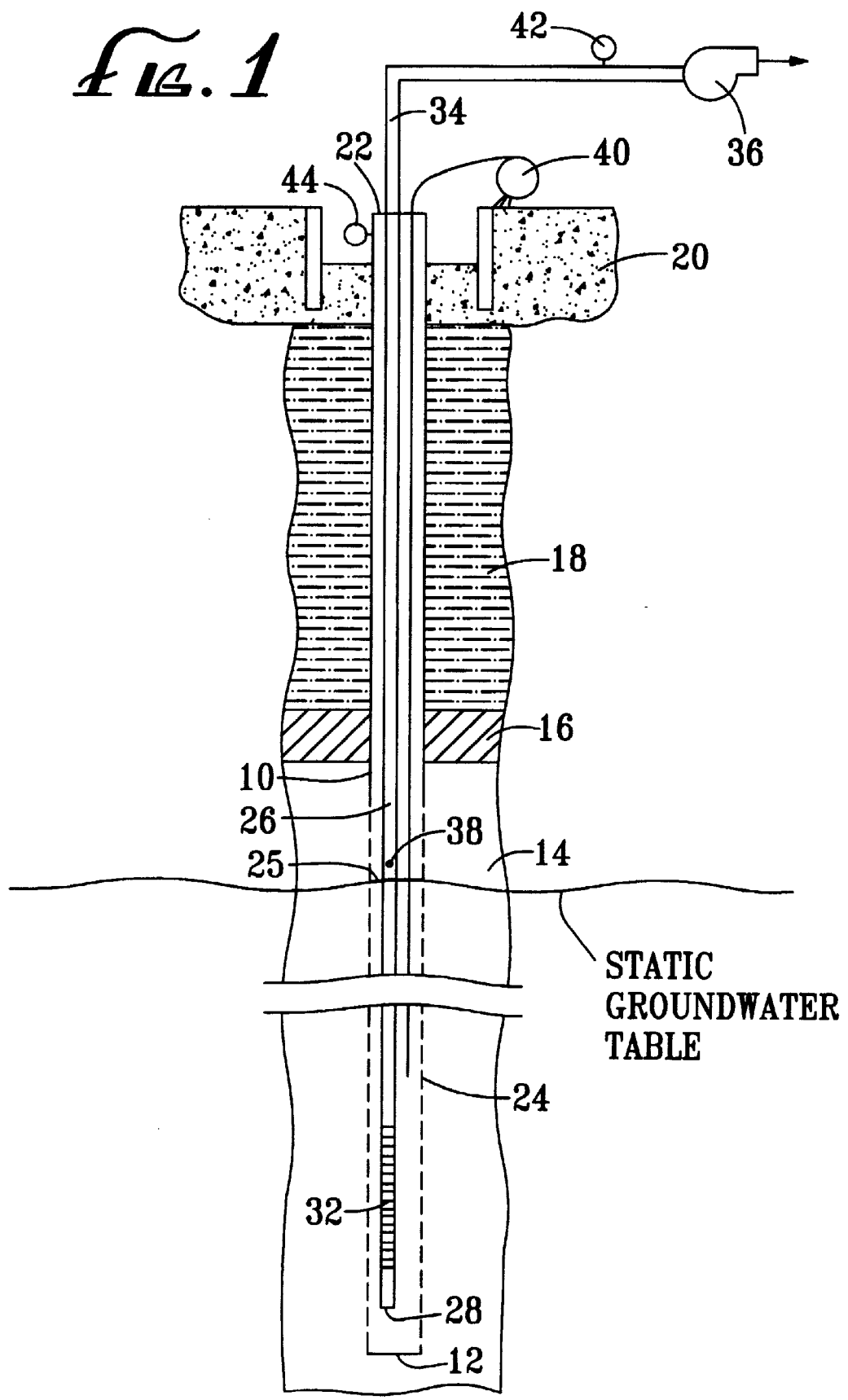

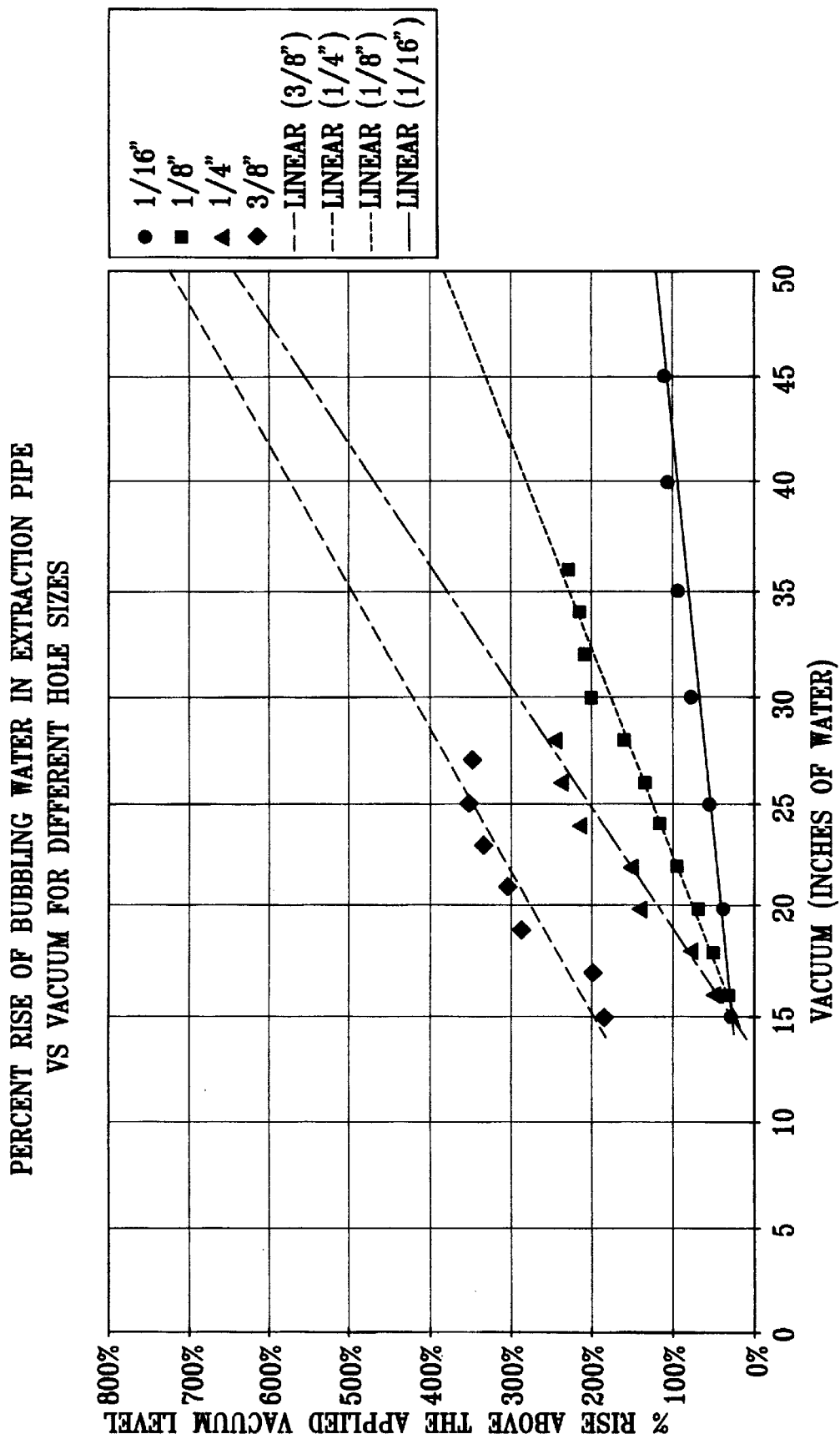

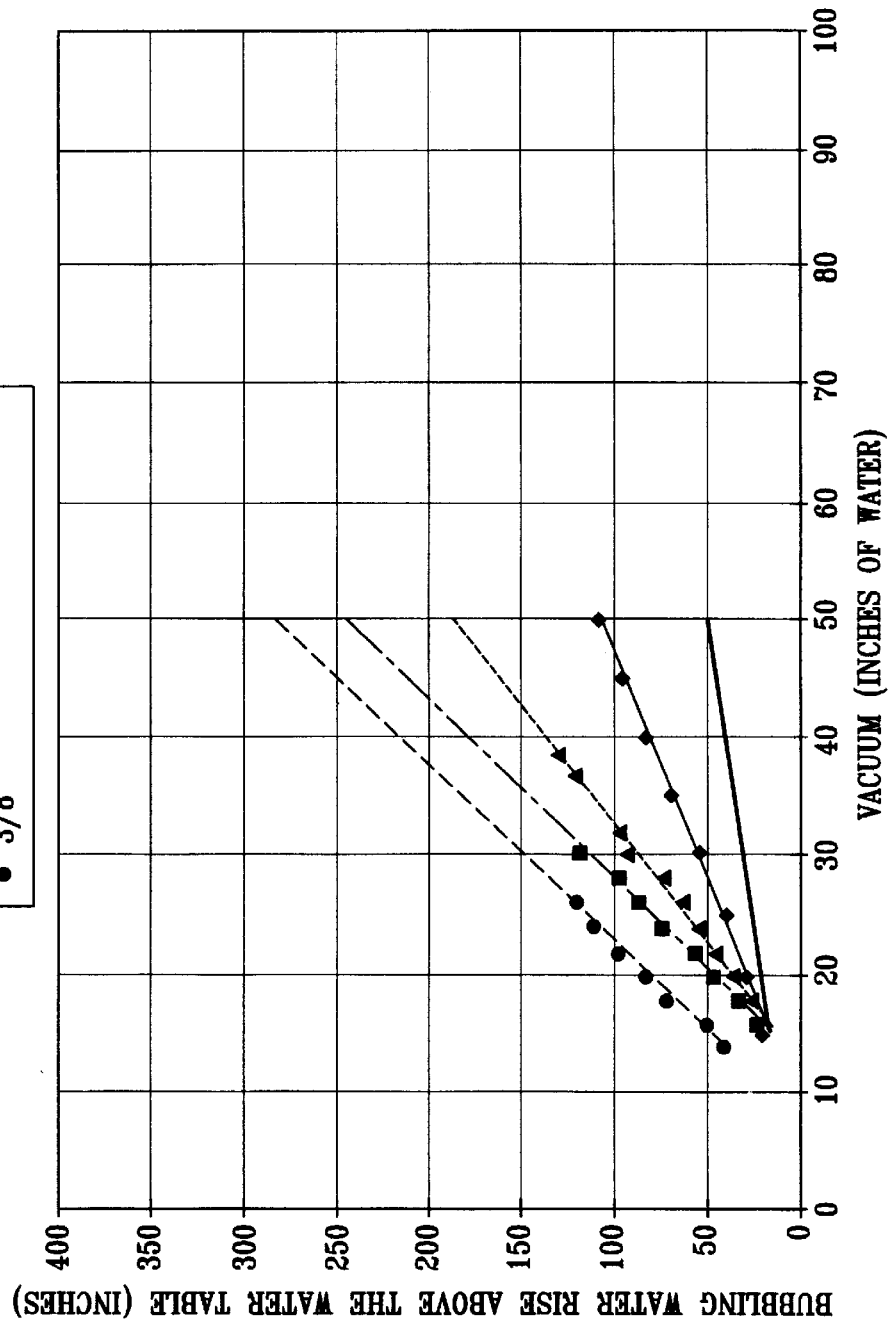

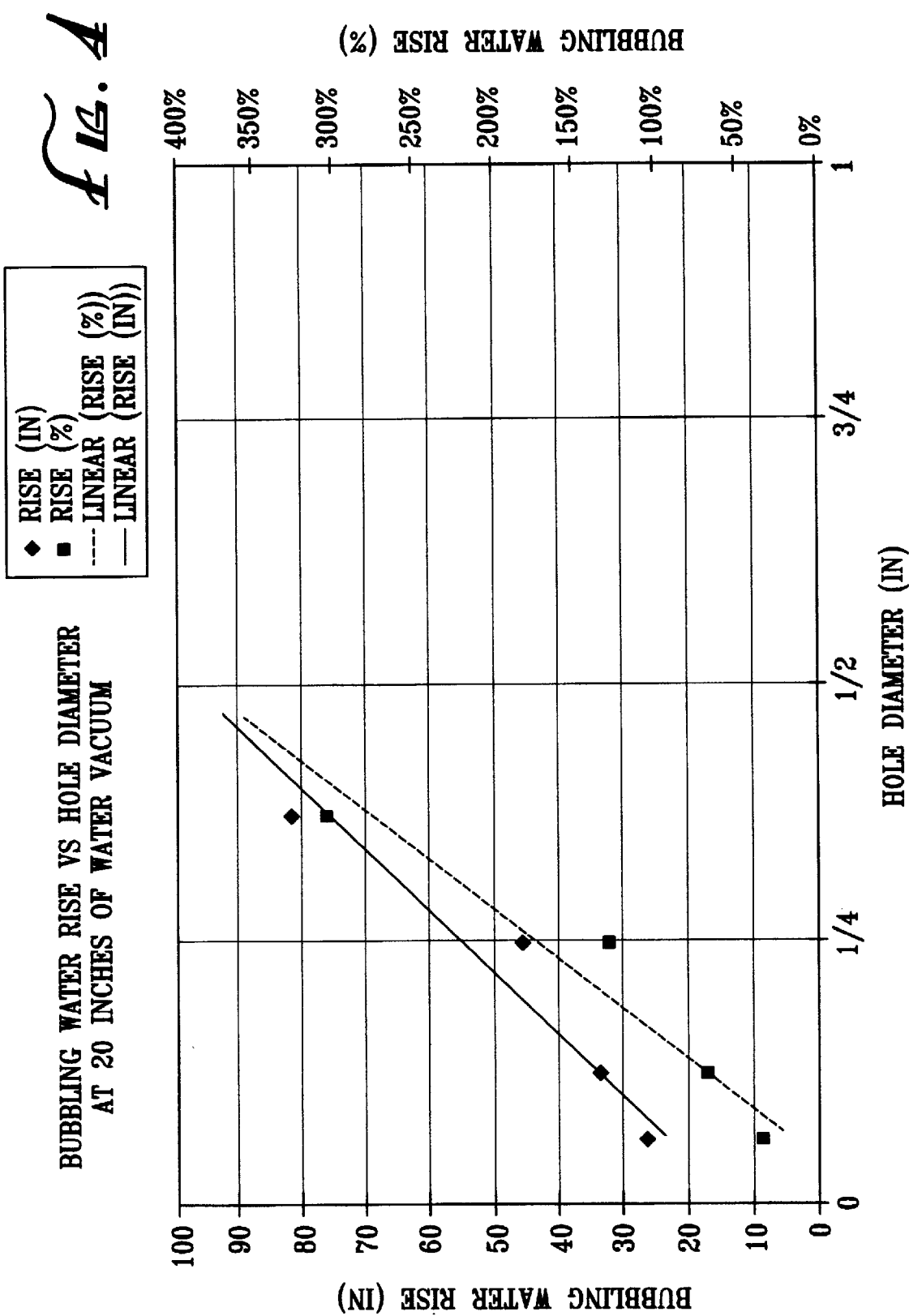

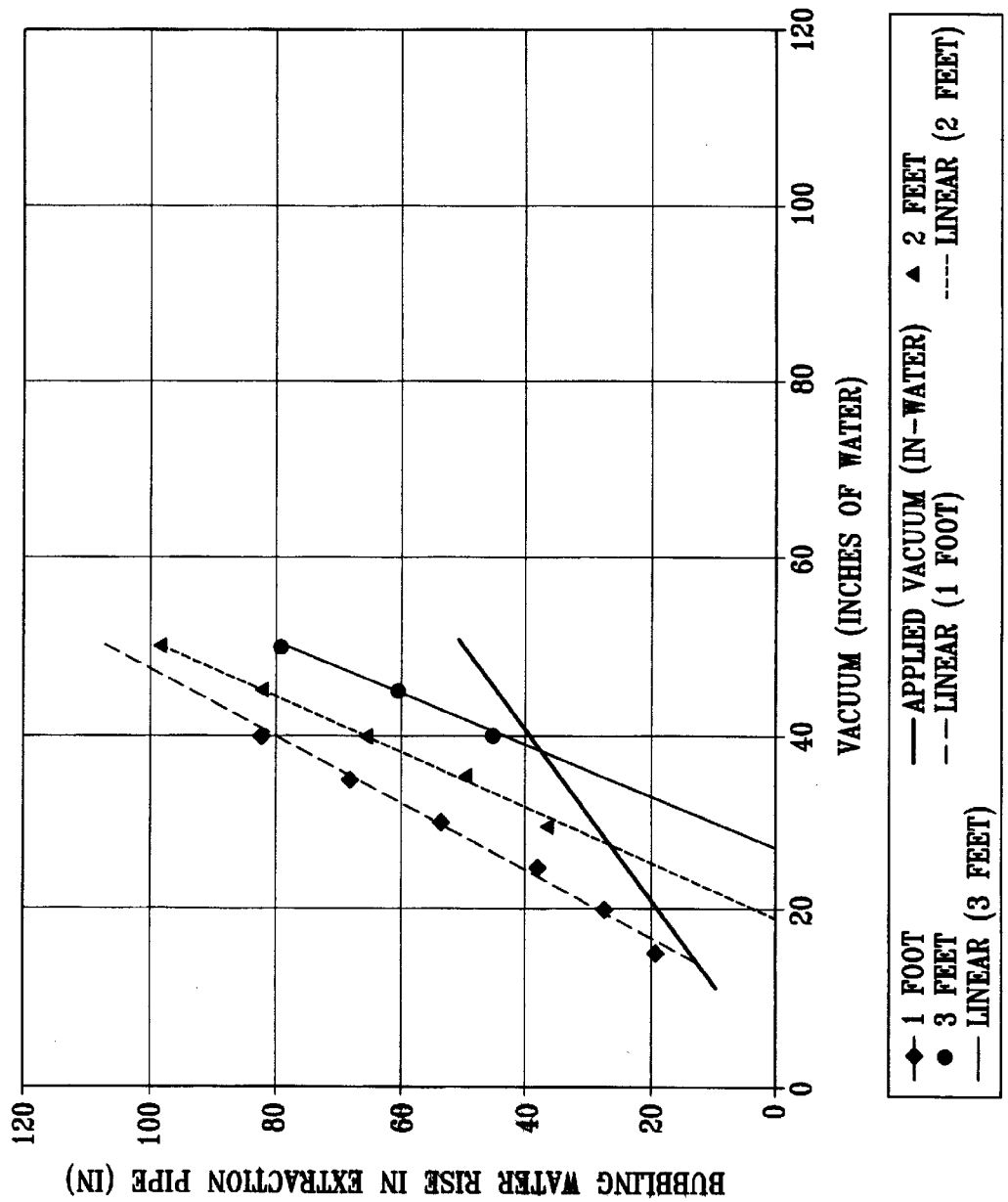

METHOD FOR BUBBLING EXTRACTION OF GROUNDWATER

CROSS-REFERENCE TO RELATED APPLICATIONS

Not Applicable

FEDERALLY FUNDED RESEARCH OR DEVELOPMENT

Not Applicable

BACKGROUND OF THE INVENTION

This invention relates generally to the field of groundwater extraction for remediation of contaminated groundwater, particularly hydrocarbon-impacted groundwater. More specifically, it relates to an improved apparatus and method for vacuum-extracting groundwater from a well installed below the static groundwater table.

Increasing concern for the purity of groundwater has led to ever-stricter standards for the presence of contaminants, particularly hydrocarbons, in groundwater. In areas where the monitoring of groundwater for the presence of such contaminants is desired, or where remediation of hydrocarbon-impacted groundwater is mandated, it is necessary to install wells extending below the static groundwater table to extract groundwater.

An existing method employed to remediate groundwater is a process called "bioslurping." Bioslurping involves the placement of a small (1 in. or 2.54 cm diameter) extraction pipe, or "stinger," down into the well below the static groundwater table, and the application of a high vacuum (negative pneumatic pressure) to the above-ground end of the stinger. The depth from which water can be extracted is limited by the capacity of the vacuum pumps available, and even for moderate depths, powerful vacuum pumps must be employed, thereby increasing the cost of remediation. Furthermore, if the extracted water is contaminated by dissolved-phase hydrocarbons, the contaminants must be "stripped" from the extracted water by carbon filtration, leading to greater expense and the need to dispose of contaminated filters.

There has thus been a long-felt need for an extraction method that is less costly and more efficient, which reduces the need for liquid filtration, and that permits extraction from greater depths than has heretofore been practical without the use of a downhole pump.

SUMMARY OF THE INVENTION

The present invention is centered on the discovery, by the present inventors, that the placement of a hole in the extraction pipe a short distance above the static groundwater table produces a bubbling action that substantially increases the rise of groundwater for any given level of applied vacuum (negative pneumatic pressure). Furthermore, it has been discovered that the bubbling action yields increased "stripping" of dissolved-phase contaminants from the water while the water is being extracted, thereby reducing the need for filtration.

Broadly, the present invention is an apparatus for extracting groundwater from a well casing that extends from an upper end exposed above ground to a lower end located below the static groundwater table. The apparatus comprises an extraction pipe placed in the well casing, the extraction pipe having a distal end located a predetermined distance below the static water column in the well casing, and a proximal end extending through the upper end of the well casing for communication with a source of negative pneumatic pressure (vacuum), wherein the extraction pipe includes a "bubbling hole" a short distance above the static groundwater table to introduce air bubbles into the extraction pipe to augment the vacuum in lifting the water through the extraction pipe.

When the extraction pipe is installed in the well casing, with its interior at ambient (atmospheric) pressure, the level of water in the extraction pipe is equal to the level of the static water column in the well casing. When a vacuum is applied to the proximal end of the extraction pipe, the water level in the extraction pipe rises in proportion to the value of the applied negative (subatmospheric) pressure. Because the pressure in the extraction pipe is now substantially lower than the pressure outside the extraction pipe in the well casing, air from the well casing is sucked into the extraction pipe through the bubbling hole, creating a stream of air bubbles in the extraction pipe. The bubbles rise through the extraction pipe, providing a water lifting action that supplements the lifting action provided by the vacuum.

Another aspect of the present invention is a method of extracting groundwater employing the above-described apparatus. The method comprises the following steps: (1) measuring the height of the static water column in the well casing above the lower end of the casing; (2) providing an extraction pipe having a proximal end, a distal end, and a hole located axially along the length of the extraction pipe at a specified distance from the distal end thereof; (3) extending the extraction pipe into the well casing so that the distal end of the extraction pipe is located at a first predetermined distance above the lower end of the well casing and the hole is located a second predetermined distance above the static water column in the well casing; and (4) applying a subatmospheric pressure to the proximal end of the extraction pipe, the magnitude of the subatmospheric pressure being sufficient to lift the groundwater through the proximal end of the extraction pipe with the assistance of air bubbles introduced into the extraction pipe from the well casing through the hole.

BRIEF DESCRIPTION OF THE DRAWINGS

FIG. 1 is an axial cross-sectional view of a groundwater extraction apparatus in accordance with a preferred embodiment of the present invention;

FIG. 2 is a graphical representation of the percentage rise of water in the extraction pipe above the applied vacuum level in the extraction pipe as a function of the magnitude of the applied vacuum for different sizes of bubbling holes;

FIG. 3 is a graphical representation of absolute rise of water in the extraction pipe as a function of the magnitude of the applied vacuum for different sizes of bubbling holes;

FIG. 4 is a graphical representation of the rise of water in the extraction pipe as a function of bubbling hole size for a constant magnitude of applied vacuum; and FIG. 5 is a graphical representation of water rise in the extraction pipe as a function of the magnitude of the applied vacuum for different bubbling hole locations.

DETAILED DESCRIPTION OF THE INVENTION

Referring first to FIG. 1, an apparatus for extracting groundwater, in accordance with a preferred embodiment of the present invention, is shown in situ in a typical monitoring or testing well. Specifically, the well comprises a well casing 10 that is installed in a pre-drilled hole in the ground that extends below the static groundwater table. The well casing 10 is typically a pipe with an inside diameter ranging from about 2 in. (5 cm) to about 10 in. (25 cm), with a preferred inside diameter of about 4 in. (about 10 cm). The well casing 10 extends upwardly from a lower end 12, through a filter pack (sand) layer 14, a seal 16 of bentonite chips and/or pellets, a layer of bentonite grout 18, and a concrete well box 20, to an upper end 22 that is exposed through the surface of the ground. The portion of the well casing 10 disposed below the seal 16 includes a perforated or slotted portion 24 (sometimes called the "screened" portion), which allows groundwater to enter the interior of the well casing 10, creating a static water column 25 in the well casing 10. Typically, the screened portion 24 of the well casing 10 extends from about 5 to 10 feet (about 150 to 300 cm) above the static groundwater table level to about 10 to 20 feet (300 to 600 cm) below it.

Installed axially within the well casing 10 is an extraction pipe or "stinger" 26. The extraction pipe typically has an internal diameter of about 1 to 2 inches (about 2.5 to 5.1 cm), with a one-inch (2.5 cm) internal diameter being preferred. When installed in the well casing 10, the extraction pipe 26 has a distal end 28 that is located at a predetermined depth below the static groundwater table. This predetermined depth will vary from well to well, depending on the depth of the static groundwater table and the level to which it is to be drawn down by the extraction process. Other than for relatively deep wells, the distal end 28 of the extraction pipe 26 is preferably located a short distance (not more than about 12 inches or about 30 cm) above the lower end 12 of the well casing 10. Starting about 6 in. (15 cm) above the distal end 28 of the extraction pipe 26 is a slotted or perforated ("screened") portion 32 that extends about 24 in. to 30 in. (about 61 cm to 76 cm) up the extraction pipe. The extraction pipe 26 has a proximal end 34 that extends out of the upper end 22 of the well casing 10, and that is coupled to a suitable vacuum pump 36, such as a liquid ring pump, of a type well known in the art.

The extraction pipe 26 is provided with a bubbling hole 38 that is located a predetermined distance above the level of the static water column 25 in the well casing 10. As discussed below, the bubbling hole 38 may be located from about 6 in. (15 cm) to about three feet (90 cm) above the static water column 25 in the well casing 10, with the optimum location being not more than about one foot (30 cm) above the static water column 25 in the well casing 10. The diameter of the bubbling hole 38 may range from about 0.06 in. (1.5 mm) to about half the inside diameter of the extraction pipe 26, with the optimum diameter being about one-quarter to about three-eighths the inside diameter of the extraction pipe 26.

The installation of the above-described apparatus of the present invention requires that the height of the static water column above the lower end 12 of the well casing 10 first be measured. This is accomplished by a water level indicator 40, of known design. Then, the extraction pipe 26 is measured to determine the desired location for the bubbling hole 38. The bubbling hole 38 is drilled into the extraction pipe 26 at this location, which is selected so that the bubbling hole 38 is located axially along the length of the extraction pipe 26 at a specified distance from its distal end 28. This specified distance is such that when the extraction pipe 26 is inserted into the well casing 10 with its distal end 28 located at the desired distance above the lower end 12 of the well casing 10, the bubbling hole 38 is located at the desired distance above the static groundwater table level.

In operation, a selected level of "vacuum" (more accurately, a selected magnitude of subatmospheric pressure) is applied to the proximal end of the extraction pipe 26 by the vacuum pump 36. The magnitude of the subatmospheric pressure applied is advantageously monitored by a first vacuum gauge 42, of known type, that is tapped into a conduit 34 connecting the extraction pipe 26 to the pump 36. A second vacuum gauge 44 may optionally be provided to determine the subatmospheric pressure drop in the well casing 10 outside of the extraction pipe 26, whereby a pressure differential between the well casing 10 and the extraction pipe 26 can be measured. The applied subatmospheric pressure causes groundwater to be drawn into the screened portion 32 of the extraction pipe 26. At the same time, the subatmospheric pressure inside the extraction pipe 26 causes atmospheric air from the well casing 10 to be drawn into the extraction pipe 26 through the bubbling hole 38. The rise in water level through the extraction pipe caused by the application of the subatmospheric pressure must be sufficient, by itself, to lift the water in the extraction pipe 26 past the bubbling hole 38. The air introduced through the bubbling hole 38 creates bubbles in this stream of rising water, and the lifting force provided by the air bubbles augments the lifting force provided by the vacuum pump 36. The combination of lifting forces provided by the applied subatmospheric pressure and the air bubbles is sufficient to lift the groundwater through the extraction pipe 26.

As a consequence of the augmented lifting action provided by the bubbles, a less powerful "vacuum" is required to lift the water any given distance through the extraction pipe, thereby allowing the use of less powerful, and thus less costly, vacuum pumps. Furthermore, groundwater can be lifted from greater depths than has heretofore been practical or economically feasible. These results have been confirmed by experimental data, as shown graphically in FIGS. 2 through 5.

FIG. 2 shows the increase in the rise of the water level in an extraction pipe of one-inch (2.5 cm) internal diameter above the applied vacuum level, versus the vacuum level applied to the extraction pipe, for bubbling holes 38 of different sizes. The applied vacuum (x-axis) is expressed in inches of water (in.-$H_2$), although the units are arbitrary, since the increase in rise (y-axis) is expressed as a percentage. It can be seen that for hole diameters in the range of $\frac{1}{16}$ inch (0.16 cm) to $\frac{3}{8}$ inch (0.95 cm) there was a marked increase in the rise of the water level over what would be achieved with applied vacuum alone. The magnitude of the water lift enhancement increased approximately linearly with the level of applied vacuum. The magnitude of this effect was also proportional to the diameter of the bubbling hole 38 (at least within the diameter range tested), with the effect being most pronounced for the larger hole sizes: $\frac{1}{4}$ inch (0.64 cm) and $\frac{3}{8}$ inch (0.95 cm).

FIG. 3 shows the rise of water (in inches), in an extraction pipe of one-inch (2.5 cm) internal diameter, above the water table, versus the magnitude of vacuum (in in.-$H_2O$) applied to the extraction pipe. The applied vacuum ranged from about 15 to 50 inches of water, and bubbling hole diameters ranging from $\frac{1}{16}$ inch (0.16 cm) to $\frac{3}{8}$ inch (0.95 cm) were employed. In addition, a "control" setup was tested, in which the extraction pipe had no bubbling hole, so that the rise due to the applied vacuum alone, unassisted by the bubbling effect, could be measured. Without a bubbling hole, the rise was linear throughout the range of applied vacuum. The enhancing effect on the rise of the water provided by the bubbling holes increased with bubbling hole diameter. For example, at 30 in.-$H_2O$, a $\frac{1}{16}$ inch (0.16 cm) diameter hole produced a rise of about 50 inches (127 cm); a ⅛ inch (0.32 cm) diameter hole produced a rise of about 95 inches (241 cm); and a ¼ inch (0.48 cm) diameter hole produced a rise of about 120 inches (305cm). By contrast, the control setup, with no bubbling hole, produces a rise of only about 30 inches (76 cm) at 30 in.-H₂O.

FIG. 4 shows the rise of water in a one-inch (2.5 cm) internal diameter extraction pipe as a function of bubbling hole size for a constant magnitude of applied vacuum (20 in.-H₂O). The enhancing effect on the rise of water increased with increasing bubbling hole diameter, whether measured absolutely (left vertical axis) or relatively (by percentage) (right vertical axis).

FIG. 5 shows the water rise in a one-inch (2.5 cm) internal diameter extraction pipe as a function of the magnitude of the applied vacuum for different bubbling hole locations. A control setup was also employed, without a bubbling hole in the extraction pipe, for the sake of comparison. Three hole locations were tested: One foot (30 cm), two feet (60 cm) and three feet (90 cm) above the static water column 25. The water rise enhancement was greatest at one foot (30 cm) above the static water column.

Another advantage of the above-described bubbling extraction apparatus and method is the more efficient removal of dissolved-phase contaminants, particularly hydrocarbons, from the groundwater. Referring again to FIG. 1, the air bubbles introduced into the extraction pipe 26 through the bubbling hole 38 volatize the dissolved contaminants from the water as the bubbles and water mix while passing through the extraction pipe 26. The resultant vapor is drawn through the pump 36 with the water, and separated therefrom by conventional means (not shown). The vapor may be directly conducted to a combustion chamber (not shown) for destruction, while the dissolved contaminants that remain absorbed in the water must be removed by a filter before being disposed of by conventional means. The more dissolved-phase contaminants that are stripped from the water by the bubbles, the less that remain to be removed by the filter, thereby allowing less frequent filter changes, with resultant lower costs for the replacement and disposal of used filters.

These results have been confirmed by experimental tests employing the above-described apparatus and method of the present invention. Specifically, concentrations of dissolved-phase hydrocarbon contaminants were reduced by as much as about 95% during water extraction using the present invention, as compared to the concentrations of these contaminants in groundwater extracted without the bubbling extraction of the present invention (i.e., by conventional means). This indicates that as much as about 95% of the dissolved-phase hydrocarbon contaminants in the groundwater were volatized out of the water by the bubbling action produced by the present invention.

It will therefore be appreciated that the present invention provides an enhanced ability to extract groundwater from deeper depths than has heretofore been practical, and that achieves more effective stripping of dissolved-phase contaminants. Furthermore, the present invention is less costly and more energy-efficient than existing bioslurping technology, and it creates less waste in the form of contaminated filters.

While a preferred embodiment of the present invention has been disclosed herein, a number of variations and modifications may suggest themselves to those skilled in the pertinent arts. For example, the bubbling hole sizes and locations described herein are not meant to be exclusive, and there may be other combinations of size and location that may work well in practice, depending on such factors as the extraction pipe length and diameter, the strength of the applied vacuum, the depth of the static groundwater table, the dimensions of the well casing, and others. These and other variations and modifications are considered within the spirit and scope of the invention, as defined by the claims that follow.

What is claimed is:

1. A method of extracting groundwater from a well extending from an upper end to a lower end located below an underground static groundwater table, whereby a static water column is created in the well, the method comprising the steps of:

(1) measuring the height of the static water column above the lower end of the well;

(2) providing an extraction pipe having a proximal end and a distal end and a hole at a specified distance from the distal end thereof;

(3) extending the extraction pipe into the well so that the distal end of the extraction pipe is located at a first predetermined distance below the static groundwater table, and the hole is located a second predetermined distance above the static water column in the well; and (4) extracting the groundwater through the extraction pipe by applying a subatmospheric pressure to the proximal end of the extraction pipe, the magnitude of the subatmospheric pressure being sufficient to lift the groundwater to the proximal end of the extraction pipe with the assistance of air bubbles introduced through the hole into the extraction pipe from the well above the static groundwater table, substantially continuously throughout the extracting step, in response to the application of the subatmospheric pressure.

2. The method of claim 1, wherein when the extending step is performed, the second predetermined distance is not more than about three feet.

3. The method of claim 1, wherein the extraction pipe has an inside diameter, and wherein the hole has a diameter between about one-sixteenth and about three-eighths the inside diameter of the extraction pipe.

4. The method of claim 2, wherein the extraction pipe has an inside diameter, and wherein the hole has a diameter between about one-sixteenth and about one-half the inside diameter of the extraction pipe.

5. A method of extracting groundwater from a well extending from an upper end to a lower end located below an underground static groundwater table, whereby a static water column is created in the well, the method comprising the steps of:

(1) measuring the height of the static water column above the lower end of the well;

(2) providing an extraction pipe having a proximal end and a distal end and an inside diameter, the extraction pipe further having a hole at a specified distance from the distal end thereof, the hole having a diameter that is between about one-sixteenth and about one-half the inside diameter of the extraction pipe;

(3) extending the extraction pipe into the well so that the distal end of the extraction pipe is located at a predetermined distance below the static groundwater table, and the hole is located not more than about three feet above the static water column in the well; and (4) extracting groundwater through the extraction pipe by applying a subatmospheric pressure to the proximal end of the extraction pipe, the magnitude of the subatmospheric pressure being sufficient to lift the groundwater to the proximal end of the extraction pipe with the assistance of air bubbles introduced into the extraction pipe from the well above the static groundwater table through the hole substantially continuously throughout the extracting step in response to the application of the subatmospheric pressure.

6. The method of claim 5, wherein, after the extending step, the hole is located not more than about one foot above the static water column.

7. The method of claim 5, wherein the diameter of the hole is between about one-quarter and about three-eighths the inside diameter of the extraction pipe.

8. The method of claim 6, wherein the diameter of the hole is between about one-quarter and about three-eighths the inside diameter of the extraction pipe.

* * * * *